United States Patent
Fukuoka et al.

(10) Patent No.: US 8,792,635 B2
(45) Date of Patent: Jul. 29, 2014

(54) RADIO COMMUNICATION BASE STATION DEVICE, RADIO COMMUNICATION MOBILE STATION DEVICE, METHOD FOR SCRAMBLING RESPONSE SIGNAL IN ARQ

(75) Inventors: Masaru Fukuoka, Ishikawa (JP); Akihiko Nishio, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 259 days.

(21) Appl. No.: 12/665,245

(22) PCT Filed: Jun. 20, 2008

(86) PCT No.: PCT/JP2008/001599
§ 371 (c)(1),
(2), (4) Date: Dec. 17, 2009

(87) PCT Pub. No.: WO2009/001533
PCT Pub. Date: Dec. 31, 2008

(65) Prior Publication Data
US 2010/0195823 A1    Aug. 5, 2010

(30) Foreign Application Priority Data
Jun. 22, 2007  (JP) ................................. 2007-165681

(51) Int. Cl.
*H04L 29/06* (2006.01)
(52) U.S. Cl.
USPC ............... 380/31; 380/33; 380/258; 380/270; 375/260

(58) Field of Classification Search
USPC ...................... 380/31–32, 270; 370/240, 473; 340/7.21; 714/748–749; 375/260
See application file for complete search history.

(56) References Cited

U.S. PATENT DOCUMENTS 6,853,631 B1 * 2/2005 Nakamura et al. ............ 370/342
(Continued)

FOREIGN PATENT DOCUMENTS

| JP | 2004-343258 | 12/2004 |
| JP | 2005-323074 | 11/2005 |

OTHER PUBLICATIONS

International Search Report dated Sep. 22, 2008.
(Continued)

*Primary Examiner* — Justin T Darrow
(74) *Attorney, Agent, or Firm* — Dickinson Wright PLLC

(57) ABSTRACT

Provided is a radio communication base station device which can prevent damage of ARQ control in an ARQ in which a response signal (ACK/NACK) channel is shared by a plurality of mobile stations. In the device, a repetition unit (106) repeats a response signal inputted from a modulation unit (105) so as to obtain a plurality of identical response signals and outputs the plurality of response signals to a scrambling unit (107). The scrambling unit (107) scrambles the identical response signals by using a scrambling code corresponding to a mobile station ID number inputted from an allocation information generation unit (101) (that is, a scrambling code unique to each of mobile stations) and outputs the scrambled response signals to an S/P unit (108).

4 Claims, 14 Drawing Sheets

(56) References Cited

U.S. PATENT DOCUMENTS

| | | | |
|---|---|---|---|
| 7,437,166 B2* | 10/2008 | Osseiran et al. | 455/452.1 |
| 8,014,287 B2* | 9/2011 | Matsushita et al. | 370/235 |
| 2003/0133429 A1* | 7/2003 | Choi et al. | 370/342 |
| 2004/0058687 A1* | 3/2004 | Kim et al. | 455/452.2 |
| 2004/0071119 A1* | 4/2004 | Ishikawa et al. | 370/335 |
| 2004/0166901 A1* | 8/2004 | Umesh et al. | 455/561 |
| 2004/0228305 A1* | 11/2004 | Grieco | 370/335 |
| 2005/0013263 A1* | 1/2005 | Kim et al. | 370/320 |
| 2005/0238053 A1* | 10/2005 | Iochi et al. | 370/473 |
| 2006/0172707 A1* | 8/2006 | Stern-Berkowitz et al. | 455/67.11 |
| 2008/0101441 A1* | 5/2008 | Palanki et al. | 375/146 |
| 2008/0188264 A1 | 8/2008 | Duan | |
| 2008/0267158 A1* | 10/2008 | Zhang et al. | 370/342 |
| 2009/0316811 A1* | 12/2009 | Maeda et al. | 375/260 |

OTHER PUBLICATIONS

3GPP TSG RAN WG1 #47bis, LG Electronics. Modifications of Uplink Synchronous HARQ scheme, R1-070245, Agenda Item: 6.9.2, Sorrento, Italy, Jan. 2007, pp. 1-5.

Extended European Search Report dated Apr. 3, 2014.

TSG RAN WG1 #37, "Downlink Control Channel Structure for Enhanced Uplink," Motorola, R1-040455, Montreal, Canada, May 10-14, 2004, pp. 1-9.

3GPP TSG RAN WG1 LTE Ad Hoc, "Multiplexing of control signaling in E-UTRA Uplink," LG Electronics, R1-061779, Cannes, France, Jun. 27-30, 2006, pp. 1-5.

3GPP TSG RAN WG2 #54, "Evaluating point-to-point bearer for single-cell MBMS transmission," ETRI, R2-062445, Tallinn, Estonia, Aug. 28-Sep. 1, 2006, pp. 1.-3.

3GPP TSG RAN WG1 Meeting #48, "Uplink data-non-associated control multiplexing," Samsung, R1-070963, St. Louis, USA, Feb. 12-16, 2007, pp. 1-3.

* cited by examiner

|  | DISTANCE | SCRAMBLING CODE | C1 | C2 | C3 | C4 |
|---|---|---|---|---|---|---|
| MOBILE STATION 1 | CELL CENTER | SC#1 | 1 | 1 | 1 | 1 |
| MOBILE STATION 2 | CELL EDGE | SC#2 | 1 | 1 | −1 | −1 |
| MOBILE STATION 3 | CELL CENTER | SC#1 | 1 | 1 | 1 | 1 |
| MOBILE STATION 4 | CELL CENTER | SC#1 | 1 | 1 | 1 | 1 |
| MOBILE STATION 5 | CELL EDGE | SC#2 | 1 | 1 | −1 | −1 |
| MOBILE STATION 6 | CELL CENTER | SC#1 | 1 | 1 | 1 | 1 |

FIG.13

|  | DISTANCE | SCRAMBLING CODE | C1 | C2 | C3 | C4 |
|---|---|---|---|---|---|---|
| MOBILE STATION 1 | CELL CENTER | SC#1 | 1 | 1 | 1 | 1 |
| MOBILE STATION 2 | CELL EDGE | SC#2 | 1 | 1 | −1 | −1 |
| MOBILE STATION 3 | CELL CENTER | SC#1 | 1 | 1 | 1 | 1 |
| MOBILE STATION 4 | CELL CENTER | SC#1 | 1 | 1 | 1 | 1 |
| MOBILE STATION 5 | CELL EDGE | SC#3 | 1 | −1 | −1 | 1 |
| MOBILE STATION 6 | CELL CENTER | SC#1 | 1 | 1 | 1 | 1 |

FIG.14

|  | DISTANCE | SCRAMBLING CODE | C1 | C2 | C3 | C4 |
|---|---|---|---|---|---|---|
| MOBILE STATION 1 | 1 | SC#1 | 1 | 1 | 1 | 1 |
| MOBILE STATION 2 | 4 | SC#4 | 1 | −1 | −1 | −1 |
| MOBILE STATION 3 | 1 | SC#1 | 1 | 1 | 1 | 1 |
| MOBILE STATION 4 | 3 | SC#3 | 1 | −1 | −1 | 1 |
| MOBILE STATION 5 | 2 | SC#2 | 1 | 1 | −1 | −1 |
| MOBILE STATION 6 | 5 | SC#1 | 1 | 1 | 1 | 1 |

FIG.15

|  | MCS | SCRAMBLING CODE | C1 | C2 | C3 | C4 |
|---|---|---|---|---|---|---|
| MOBILE STATION 1 | QPSK, R=1/2 | SC#1 | 1 | 1 | 1 | 1 |
| MOBILE STATION 2 | QPSK, R=1/4 | SC#2 | 1 | 1 | −1 | −1 |
| MOBILE STATION 3 | QPSK, R=1/2 | SC#1 | 1 | 1 | 1 | 1 |
| MOBILE STATION 4 | QPSK, R=1/2 | SC#1 | 1 | 1 | 1 | 1 |
| MOBILE STATION 5 | QPSK, R=1/4 | SC#2 | 1 | 1 | −1 | −1 |
| MOBILE STATION 6 | QPSK, R=1/2 | SC#1 | 1 | 1 | 1 | 1 |

FIG.16

S1:PHASE ROTATION AMOUNT = 0

S1:PHASE ROTATION AMOUNT = $\pi/2$

RADIO COMMUNICATION BASE STATION DEVICE, RADIO COMMUNICATION MOBILE STATION DEVICE, METHOD FOR SCRAMBLING RESPONSE SIGNAL IN ARQ

TECHNICAL FIELD

The present invention relates to a radio communication base station apparatus, radio communication mobile station apparatus and scrambling method for response signals in ARQ.

BACKGROUND ART

Up till now, in mobile communication, ARQ (Automatic Repeat reQuest) is applied to uplink data from a radio communication mobile station apparatus (hereinafter abbreviated to "mobile station") to a radio communication base station apparatuses (hereinafter abbreviated to "base station"), and a response signal representing error detection results of uplink data is fed back to the mobile station in downlink. A CRC (Cyclic Redundancy Check) is performed for uplink data, and an ACK (ACKnowledgement) is fed back if CRC=OK (no error), or a NACK (Negative ACKnowledgement) is fed back if CRC=NG (error present), as a response signal to the mobile station.

Recently, to use downlink communication resources efficiently, studies are underway for ARQ in which channels for response signals are shared for use between a plurality of mobile stations. Further, in this ARQ, a base station feeds back a response signal to a mobile station a predetermined time after receiving uplink data. If a NACK is fed back from the base station, the mobile station retransmits uplink data to the base station a predetermined time after receiving the NACK signal. Further, in this ARQ, information indicating to which mobile station a response signal is directed, is not attached to the response signal (see Non-Patent Document 1).

Also, a base station transmits allocation information indicating to which mobile station among a plurality of mobile stations an uplink data channel is allocated, on a per mobile station basis. Allocation information of each mobile station includes mobile station ID information indicating to which mobile station the allocation information is directed. For example, allocation information includes, as mobile station ID information, CRC bits masked by the ID number of the destination mobile station of that allocation information. Each mobile station decides that allocation information of CRC=OK (no error) acquired by demasking allocation information by the ID number of that mobile station, is allocation information directed to the subject mobile station. Thus, a mobile station performs blind detection as to whether or not allocation information is directed to that mobile station.
Non-Patent Document 1: 3GPP RAN WG1 meeting document, R1-070245, "Modifications of Uplink Synchronous HARQ scheme", LG Electronics

DISCLOSURE OF INVENTION

Problems to be Solved by the Invention

FIG. 1 illustrates a specific example of a sequence in the above ARQ that is studied recently. In the following explanation, assume that a base station feeds back a response signal to a mobile station one TTI (Transmission Time Interval) after receiving uplink data and the mobile station retransmits uplink data to the base station one TTI after receiving the NACK.

First, at time t1, a base station transmits allocation information indicating that an uplink data channel is allocated to mobile station 1.

At time t2, mobile station 1 performs blind detection correctly that the above allocation information is allocated to that mobile station. Therefore, at time t3, mobile station 1 performs an initial transmission of uplink data.

Here, assume that at time t2, mobile station 2 has mistaken the above allocation information for allocation information directed to that mobile station by blind detection. Therefore, at time t3, mobile station 2 also performs an initial transmission of uplink data.

Thus, when mobile station 2 has mistaken allocation information directed to mobile station 1 for allocation information directed to mobile station 2 by blind detection, the initial transmission data from mobile station 1 and the initial transmission data from mobile station 2 collide, and, as a result, the CRC result in the base station is more likely to be NG (error present). Therefore, at time t5, the base station feeds back a NACK.

Mobile station 1, having performed an initial transmission of uplink data at time t3, decides that the NACK fed back from the base station at time t5 is directed to that mobile station and receives the NACK. Therefore, at time t7, mobile station 1 retransmits uplink data (first time).

On the other hand, mobile station 2, having performed an initial transmission of uplink data at time t3, also decides that the NACK fed back from the base station at time t5 is directed to that mobile station and receives the NACK. Therefore, at time t7, mobile station 2 also retransmits uplink data (first time).

That is, as described above, the retransmission data from mobile station 1 and the retransmission data from mobile station 2 collide, and, as a result, the CRC result in the base station is more likely to be NG (error present). Therefore, at time t9, the base station feeds back a NACK.

Subsequently, a series of uplink data transmission from both mobile stations, collision of uplink data, CRC=NG (error present), feedback of a NACK and uplink data transmission from both mobile stations, is repeated, and, as a result, ARQ control does not operated correctly.

Thus, with ARQ in which channels for response signals are shared for use between a plurality of mobile stations, there is a problem that, if one of the mobile stations performs blind detection incorrectly, ARQ control is damaged.

It is therefore an object of the present invention to provide a base station, mobile station and scrambling method for response signals, that, in ARQ in which channels for response signals are shared for use between a plurality of mobile stations, can prevent damage of ARQ control.

Means for Solving the Problem

The base station of the present invention employs a configuration having: a duplicating section that duplicates a response signal to produce a plurality of identical response signals; and a scrambling section that scrambles the plurality of response signals by a scrambling code allocated to a destination mobile station of the plurality of response signals.

The mobile station of the present invention employs a configuration having: a descrambling section that descrambles a plurality of identical response signals scrambled by a scrambling code allocated to a different mobile station, by a scrambling code allocated to the mobile station; a combining section that combines the plurality of descrambled response signals to produce a combined signal; and a deciding section that decides which of an acknowledgement, negative acknowledgement and discontinuous transmission the combined signal represents.

The scrambling method of the present invention for a response signal in an automatic repeat request, includes scrambling a plurality of identical response signals by a scrambling code allocated to a destination mobile station of the plurality of response signals.

Advantageous Effect of Invention

According to the present invention, in ARQ in which channels for response signals are shared for use between a plurality of mobile stations, it is possible to prevent damage of ARQ control.

BRIEF DESCRIPTION OF DRAWINGS

FIG. 1 illustrates an example of a sequence in ARQ according to Embodiment 1;
FIG. 13 is an example of scrambling code allocation according to Embodiment 2;
FIG. 14 is an example of scrambling code allocation according to Embodiment 3;
FIG. 15 is an example of scrambling code allocation according to Embodiment 4;
FIG. 16 is an example of scrambling code allocation according to Embodiment 5.

BEST MODE FOR CARRYING OUT INVENTION

Embodiments of the present invention will be explained below in detail with reference to the accompanying drawings.
(Embodiment 1)
FIG. 2 illustrates the configuration of base station 100 according to the present embodiment, and FIG. 3 illustrates the configuration of mobile station 200 according to the present embodiment.

Figure 2:
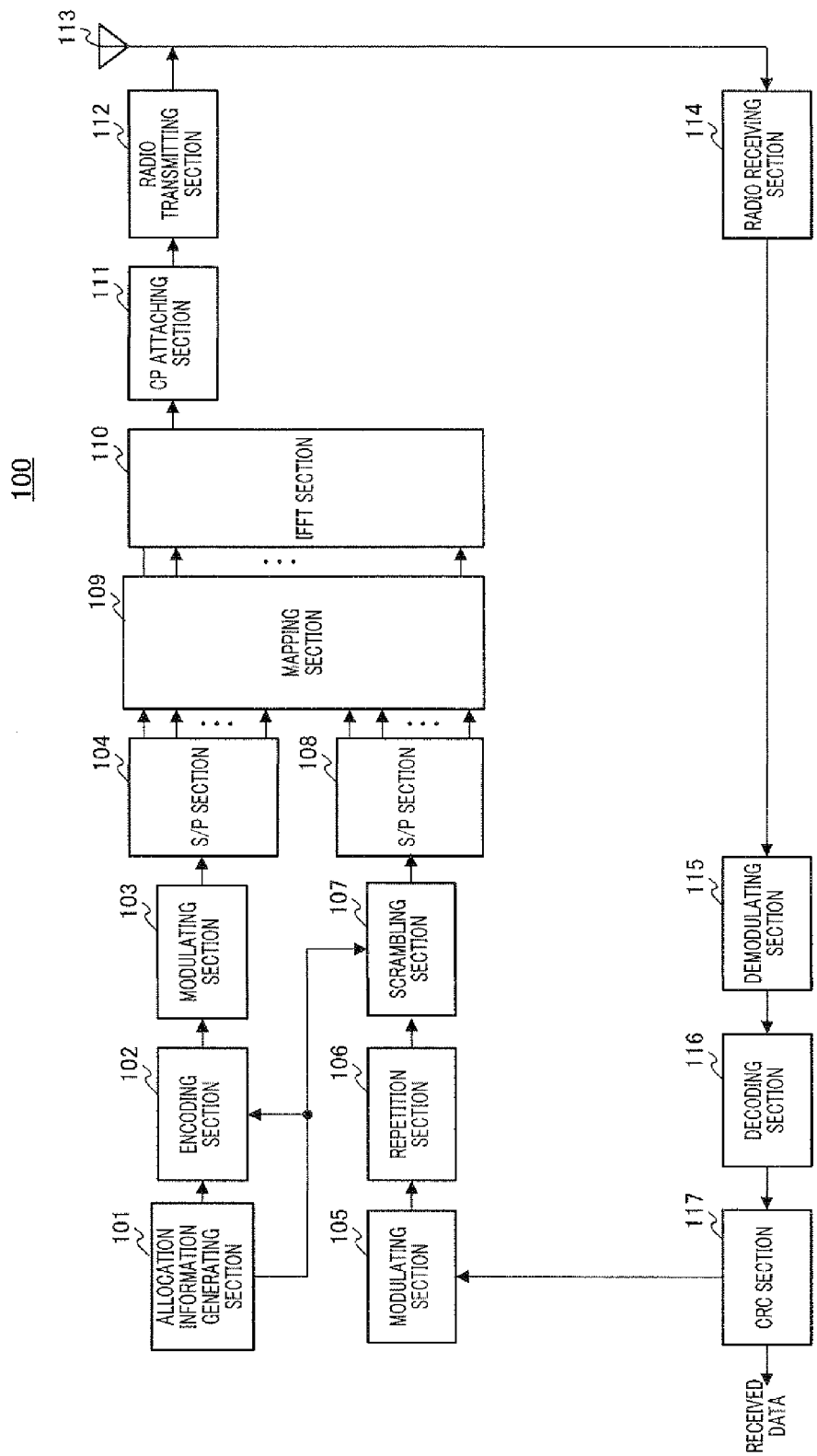
FIG. 2 is a block diagram showing the configuration of a base station according to Embodiment 1.
Figure 3:
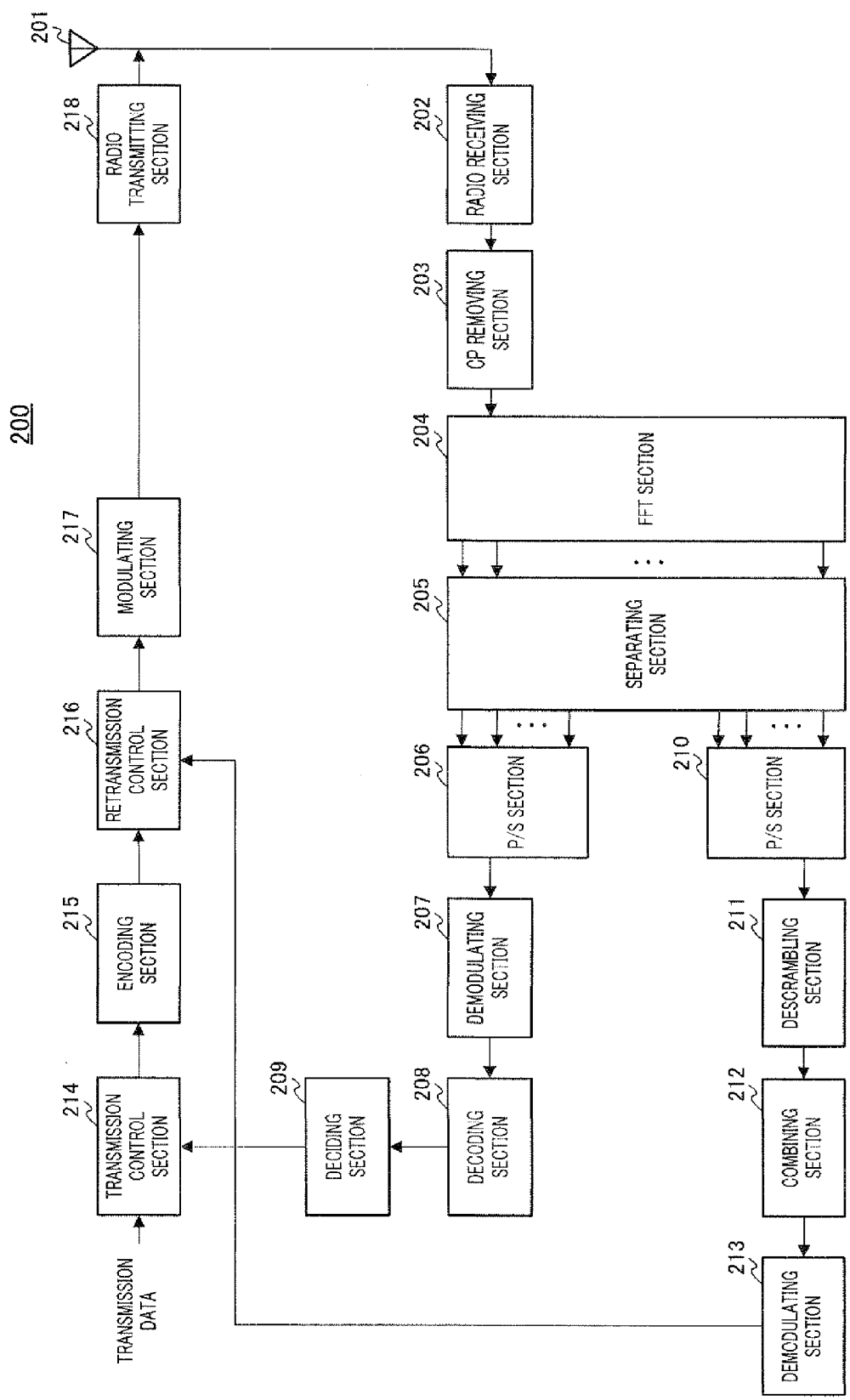
FIG. 3 is a block diagram showing the configuration of a mobile station according to Embodiment 1.

Here, to avoid complicated explanation, FIG. 2 illustrates components associated with reception of uplink data and components associated with transmission of downlink response signals to uplink data, which are closely related to the present invention, and illustration and explanation of the components associated with transmission of downlink data will be omitted. Similarly, FIG. 3 illustrates components associated with transmission of uplink data and components associated with reception of downlink response signals to uplink data, which are closely related to the present invention, and illustration and explanation of the components associated with reception of downlink data will be omitted.

In base station 100 shown in FIG. 2, allocation information generating section 101 generates allocation information indicating to which mobile station an uplink data channel is going to be allocated, and outputs the allocation information to encoding section 102. Further, allocation information generating section 101 outputs the ID number of the destination mobile station of the generated allocation information, to encoding section 102 and scrambling section 107.

Encoding section 102 encodes the allocation information and outputs the result to modulating section 103. In this case, encoding section 102 generates a plurality of CRC bits from the allocation information and masks the plurality of CRC bits by the mobile station ID number received as input from allocation information generating section 101. Therefore, the allocation information includes, as mobile station ID information, the CRC bits masked by the ID number of the destination mobile station of the allocation information.

Modulating section 103 generates a plurality of allocation information symbols by modulating the encoded allocation information, and outputs the results to S/P section 104.

S/P section 104 converts the plurality of allocation information symbols received as input from modulating section 103 in serial, into parallel allocation information symbols, and outputs the results to mapping section 109.

Modulating section 105 performs modulation processing of a response signal to uplink data (i.e. ACK or NACK) and outputs the response signal subjected to modulation processing to repetition section 106.

Repetition section 106 duplicates (repeats) the response signal received as input from modulating section 105 to acquire a plurality of identical response signals, and outputs the plurality of response signals to scrambling section 107.

Scrambling section 107 scrambles the plurality of identical response signals by the scrambling code corresponding to the mobile station ID number received as input from allocation information generating section 101 (i.e. the specific scrambling code to each mobile station), and outputs a plurality of scrambled response signals to S/P section 108. The scrambling processing in scrambling section 107 will be described later in detail.

S/P section 108 converts the plurality of response signals received as input from scrambling section 107 in serial, into parallel response signals, and outputs the results to mapping section 109.

Mapping section 109 maps the allocation information symbols and response signals on part of a plurality of subcarriers forming an OFDM symbol, and outputs the result to IFFT (Inverse Fast Fourier Transform) section 110.

IFFT section 110 generates an OFDM symbol by performing an IFFT of the allocation information symbols and response signals mapped on part of the plurality of subcarriers, and outputs the OFDM symbol to CP (Cyclic Prefix) attaching section 111.

CP attaching section 111 attaches the same signal as in the tail end of the OFDM symbol to the head of that OFDM symbol as a CP.

Radio transmitting section 112 performs transmission processing such as D/A conversion, amplification and up-conversion on the OFDM symbol with the CP, and transmits the result from antenna 113 to mobile station 200.

Also, radio receiving section 114 receives uplink data transmitted from mobile station 200 via antenna 113, and performs reception processing such as down-conversion and A/D conversion on this uplink data.

Demodulating section 115 demodulates the uplink data and outputs the demodulated uplink data to decoding section 116.

Decoding section 116 decodes the demodulated uplink data and outputs the decoded uplink data to CRC section 117.

CRC section 117 performs error detection of the decoded uplink data using CRC, generates an ACK if CRC=OK (no error) or generates a NACK if CRC=NG (error present), as a response signal, and outputs the generated response signal to modulating section 105. The uplink data is one of initial transmission data and retransmission data, and, consequently, CRC section 114 generates a response signal to the initial transmission data or a response signal to the retransmission data. Further, if CRC=OK (no error), CRC section 117 outputs the decoded uplink data as received data.

On the other hand, in mobile station 200 shown in FIG. 3, radio receiving section 202 receives an OFDM symbol transmitted from base station 100 via antenna 201, and performs reception processing such as down-conversion and A/D conversion on this OFDM symbol.

CP removing section 203 removes the CP from the OFDM symbol subjected to reception processing.

FFT (Fast Fourier Transform) section 204 acquires allocation information symbols and response signals by performing an FFT of the OFDM symbol without the CP, and outputs these to separating section 205.

Separating section 205 separates the allocation information symbols from the response signals, outputs the allocation information symbols to P/S section 206 and outputs the response signals to P/S section 210.

P/S section 206 converts the plurality of allocation information symbols received as input from separating section 205 in parallel, into serial allocation information symbols, and outputs the results to demodulating section 207.

Demodulating section 207 demodulates the allocation information symbols and outputs the demodulated allocation information to decoding section 208.

Decoding section 208 decodes the demodulated allocation information and outputs the decoded allocation information to deciding section 209.

Deciding section 209 performs blind detection as to whether or not the allocation information received as input from decoding section 208 is directed to the subject mobile station. Deciding section 209 decides, as allocation information directed to that mobile station, allocation information of CRC=OK (no error) acquired by demasking the allocation information received as input from decoding section 208 by the ID number of that mobile station. Further, deciding section 209 outputs the allocation information of CRC=OK (no error) (i.e. allocation information directed to that mobile station) to transmission control section 214.

P/S section 210 converts the plurality of response signals received as input from separating section 205 in parallel, into serial response signals, and outputs the results to descrambling section 211.

Descrambling section 211 descrambles the plurality of response signals received as input from P/S section 210 by the scrambling code corresponding to the ID number of the subject mobile station (i.e. the scrambling code allocated to that mobile station), and outputs the plurality of descrambled response signals to combining section 212.

Combining section 212 combines the plurality of descrambled response signals and outputs a combined signal to demodulating section 213.

Also, the descrambling processing in descrambling section 211 and the combination processing in combining section 212 will be described later in detail.

Demodulating section 213 performs demodulation processing on the combined response signal, and decides which of an ACK, a NACK and DTX (Discontinuous Transmission) the demodulated signal represents. Further, demodulating section 213 outputs the decision result to retransmission control section 216.

Upon receiving allocation information from deciding section 209, transmission control section 214 outputs transmission data to encoding section 215.

Encoding section 215 encodes the transmission data and outputs the result to retransmission control section 216.

Retransmission control section 216 holds the encoded transmission data upon initial transmission and outputs it to modulating section 217. Here, retransmission control section 216 holds the transmission data until retransmission control section 216 receives as input an ACK or DTX from demodulating section 213 as a decision result, and discards the transmission data upon receiving as input the ACK or DTX. Further, upon receiving as input a NACK from demodulating section 213 as a decision result, that is, upon retransmission, retransmission control section 216 outputs the transmission data to modulating section 217 again.

Modulating section 217 modulates the encoded transmission data received as input from retransmission control section 216 and outputs the result to radio transmitting section 218.

Radio transmitting section 218 performs transmission processing such as D/A conversion, amplification and up-conversion on the modulated transmission data, and transmits the result from antenna 201 to base station 100. Here, the data transmitted as above is uplink data.

Next, the scrambling processing in scrambling section 107 of base station 100, the descrambling processing in descrambling section 211 of mobile station 200 and the combination processing in combining section 212 of mobile station 200 will be explained in detail using the sequence example shown in FIG. 4.

Here, assume that the scrambling code for mobile station 1 (i.e. the specific scrambling code to mobile station 1) is SC #1 (C1, C2, C3, C4)=(1, 1, 1, 1), and the scrambling code for mobile station 2 (i.e. the specific scrambling code to mobile station 2) is SC #2 (C1, C2, C3, C4)=(1, 1, −1, −1).

Also, mobile station 1 and mobile station 2 both employs the configuration shown in FIG. 3.

Figure 5:
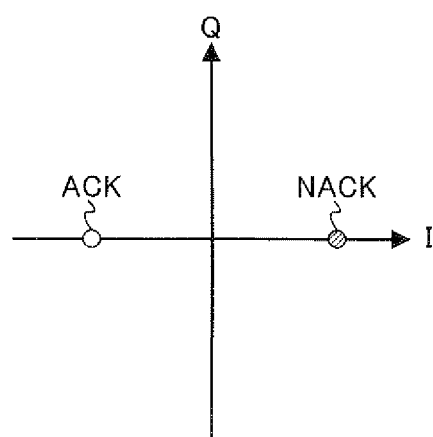
FIG. 5 illustrates a constellation pattern according to Embodiment 1.

Also, FIG. 5 illustrates the constellation pattern in modulating section 105 of base station 100 (i.e. the constellation pattern of a response signal).

Also, assume that the repetition factor RF in repetition section 106 of base station 100 is 4, and repetition section 106 performs four-times repetition. Therefore, repetition section 106 produces four identical response signals.

Figure 4:
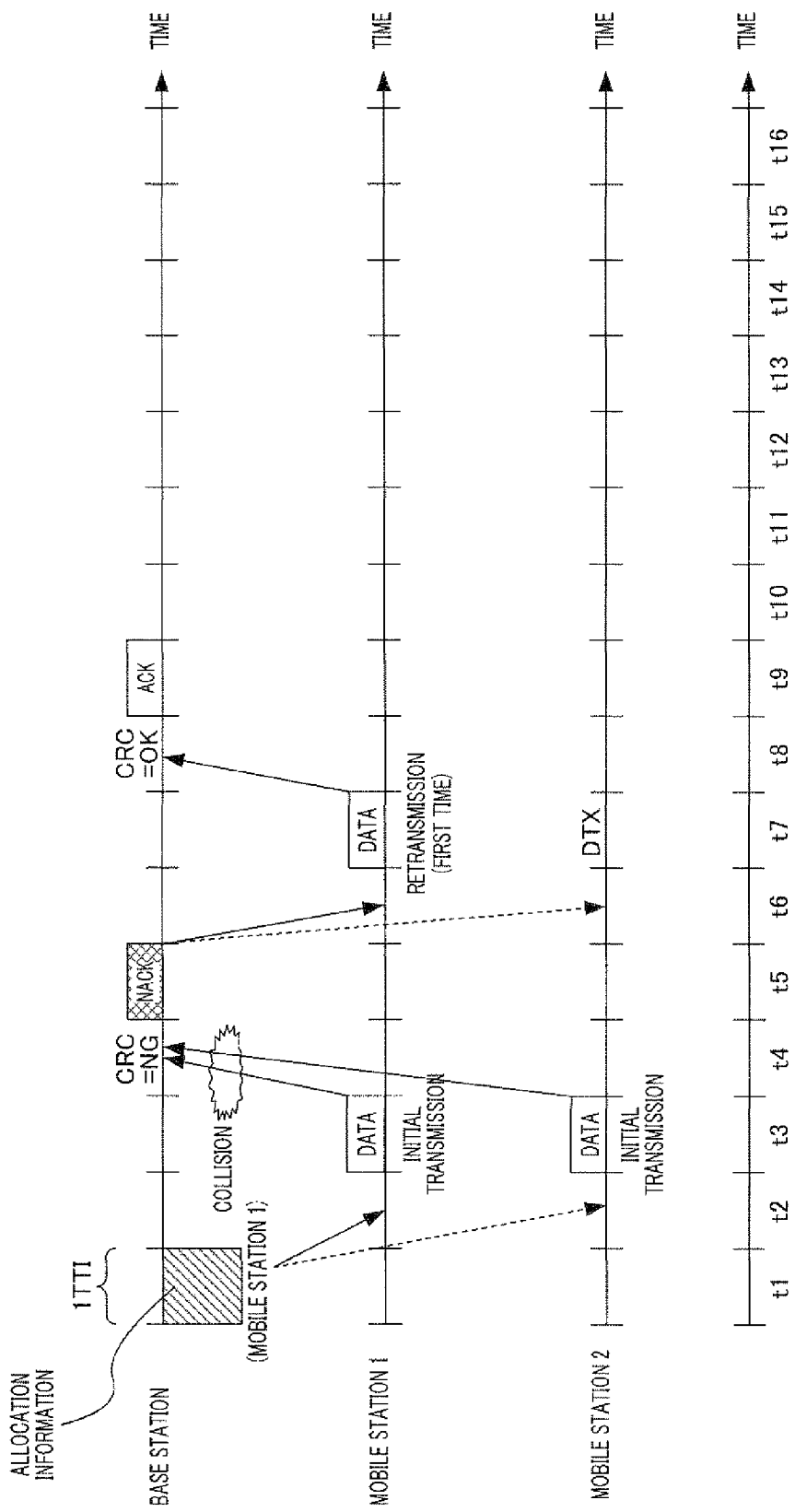

In FIG. 4, first, at time t1, base station 100 transmits allocation information indicating that an uplink data channel is allocated, to mobile station 1. Therefore, allocation information generating section 101 outputs the mobile station ID number (#1) to scrambling section 107.

Mobile station 1 correctly decides that the allocation information at time t2 is allocation information directed to that mobile station, by blind detection. Therefore, at time t3, mobile station 1 performs an initial transmission of uplink data.

On the other hand, assume that mobile station 2 has mistaken the above allocation information at time t2 for allocation information directed to that mobile station by blind detection. Therefore, at time t3, mobile station 2 also performs an initial transmission of uplink data.

Figure 6:
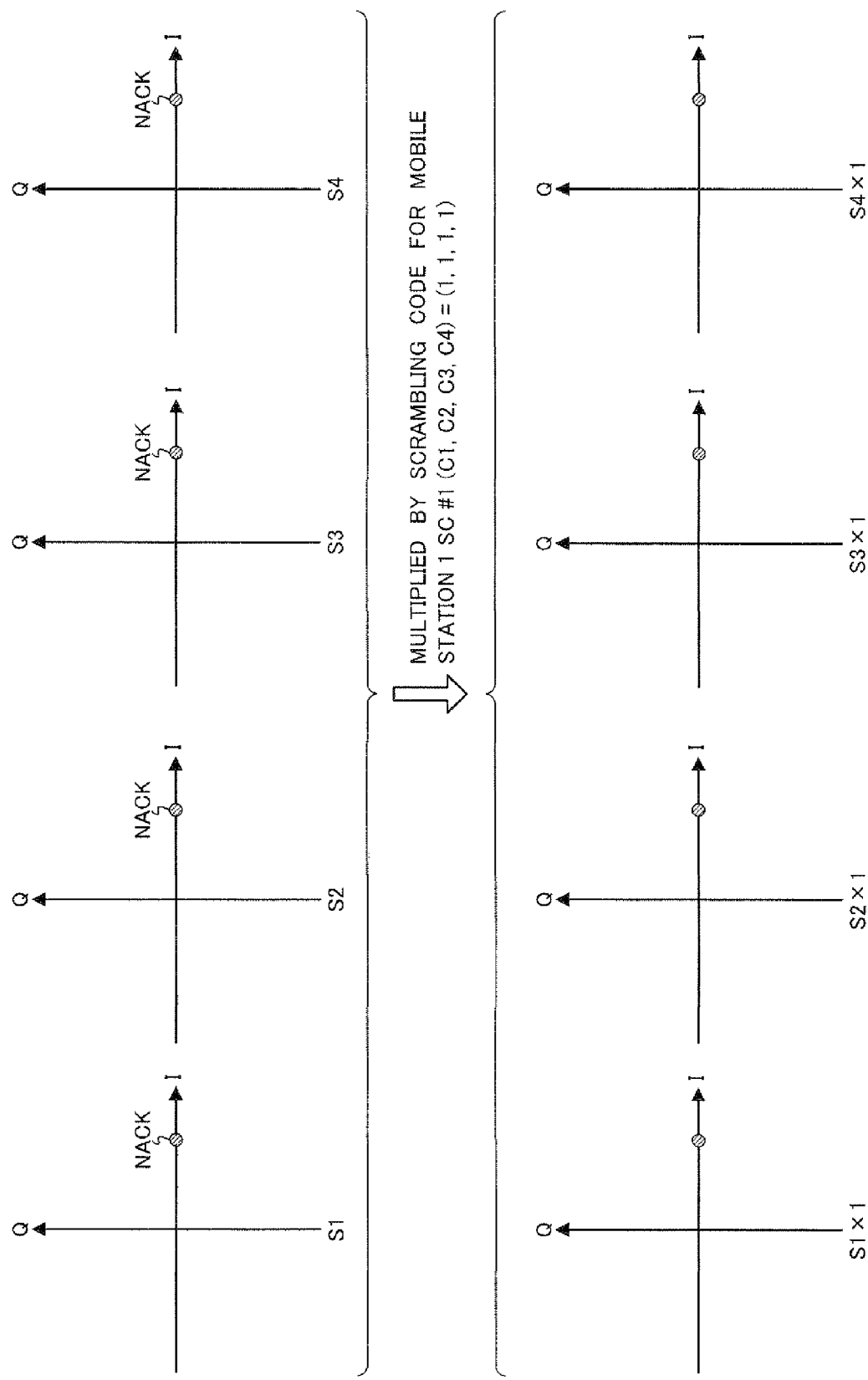
FIG. 6 illustrates a scrambling example according to Embodiment 1.

Therefore, at time t4, the initial transmission data from mobile station 1 and the initial transmission data from mobile station 2 collide, and, as a result, the CRC result in base station 100 is more likely to be NG (error present). Therefore, at time t5, base station 100 feeds back a NACK. In this case, scrambling section 107 has received as input the mobile station ID number (#1) at time t1, and, consequently, as shown in FIG. 6, scrambles four NACK symbols (S1, S2, S3, S4) to be outputted from repetition section 106 by SC #1 (C1, C2, C3, C4). That is, scrambling section 107 multiplies four NACK symbols Si, S2, S3 and S4 by 1, 1, 1 and 1, respectively. Therefore, as shown in FIG. 6, response signals fed back from base station 100 are S1×1, S2×1, S3×1 and S4×1.

Figure 7:
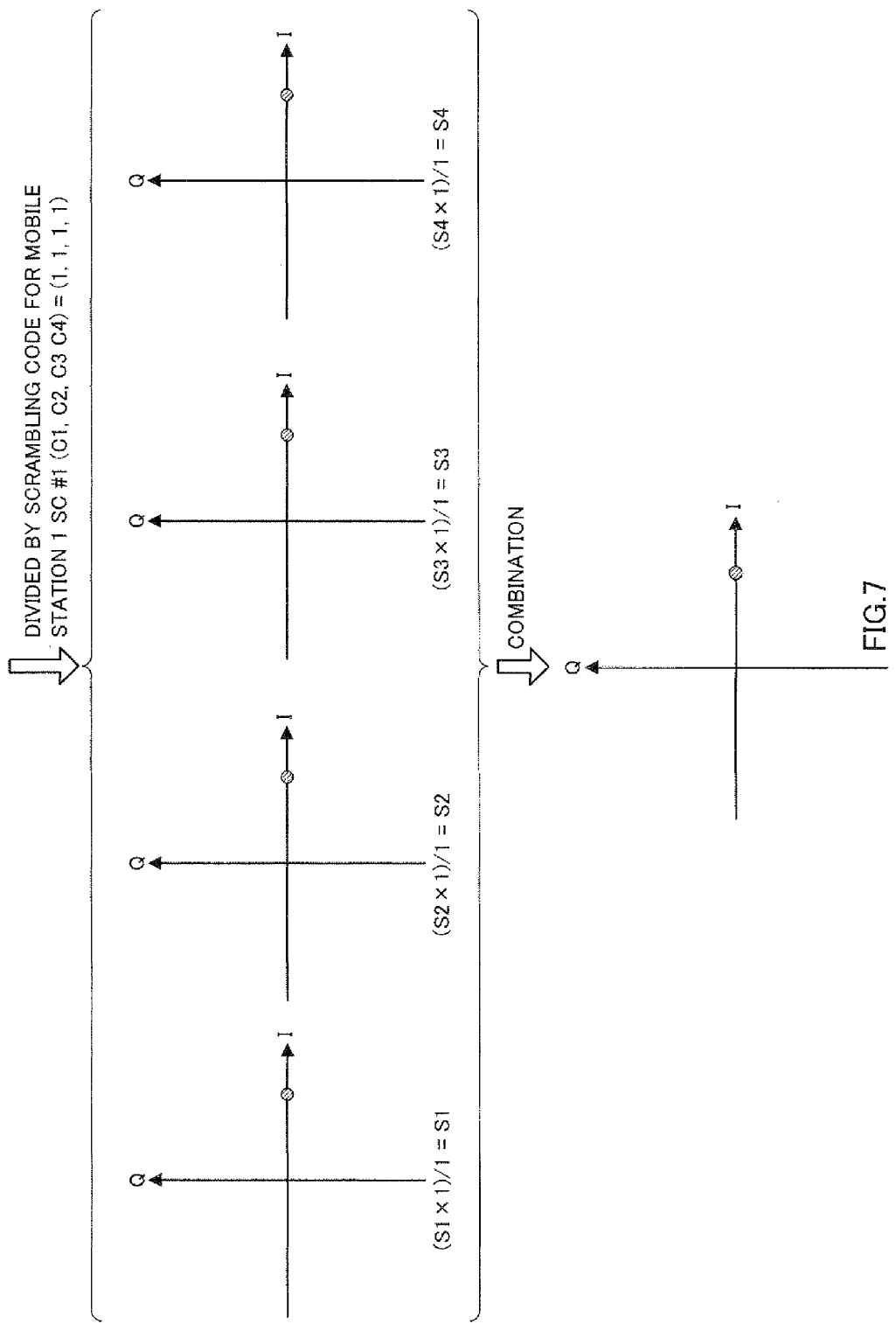
FIG. 7 illustrates a descrambling example according to Embodiment 1 (mobile station 1)

Mobile station 1, having performed initial transmission of uplink data at time t3, decides that four response signals fed back from base station 100 at time t5 are directed to that mobile station and receives these response signals. In this case, as shown in FIG. 7, descrambling section 211 of mobile station 1 descrambles four response signals outputted from P/S section 210, that is, descrambles S1×1, S2×1, S3×1 and S4×1 shown in FIG. 6, by the scrambling code for that mobile station, SC #1. That is, descrambling section 211 of mobile station 1 divides the four symbols S1×1, S2×1, S3×1 and S4×1 by 1, 1, 1 and 1, respectively. Therefore, descrambling section 211 of mobile station 1 provides constellations of S1, S2, S3 and S4 shown in FIG. 7.

Figure 8:
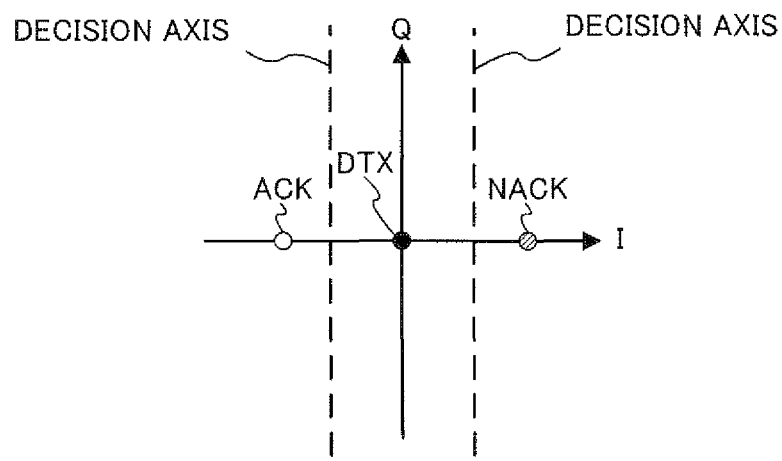
FIG. 8 illustrates a decision example according to Embodiment 1.

Next, combining section 212 of mobile station 1 combines S1, S2, S3 and S4 received as input from descrambling section 211. Therefore, as shown in FIG. 7, the combined symbol is allocated to the NACK constellation point of (FIG. 5) in base station 100. Demodulating section 213 of mobile station 1 then decides this combined symbol based on the decision axes shown in FIG. 8. That is, mobile station 1 decides that a response signal from base station 100 to that mobile station is a NACK. Therefore, mobile station 1 retransmits uplink data (first time) at time t7.

Figure 9:
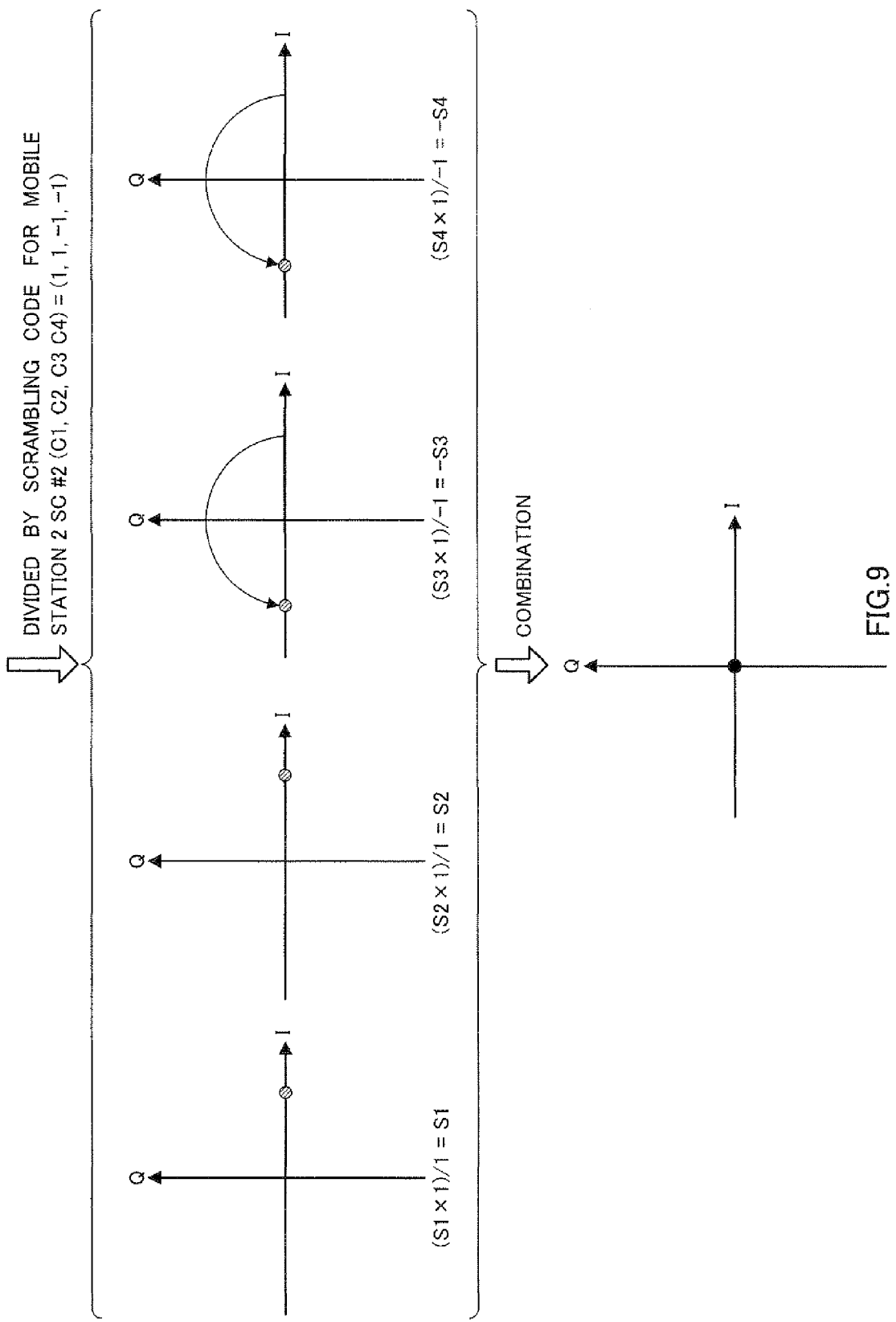
FIG. 9 is a descrambling example according to Embodiment 1 (mobile station 2)

On the other hand, mobile station 2, having performed an initial transmission of uplink data at time t3, decides that four response signals fed back from base station 100 at time t5 are directed to that mobile station and receives these response signals. In this case, as shown in FIG. 9, descrambling section 211 of mobile station 2 descrambles four response signals outputted from P/S section 210, that is, S1×1, S2×1, S3×1 and S4×1 shown in FIG. 6, by the scrambling code for that mobile station, SC #2. That is, descrambling section 211 of mobile station 2 divides the four symbols S1×1, S2×1, S3×1 and S4×1 by 1, 1, −1 and −1, respectively. Therefore, descrambling section 211 of mobile station 2 provides constellations of S1, S2, −S3 and −S4 shown in FIG. 9.

Next, combining section 212 of mobile station 2 combines S1, S2, −S3 and −S4 received as input from descrambling section 211. Therefore, as shown in FIG. 9, the combined symbol is allocated to the constellation point of (I, Q)=(0, 0). In the same way as in demodulating section 213 of mobile station 1, demodulating section 213 of mobile station 2 then decides this combined symbol based on the decision axis shown in FIG. 8. That is, mobile station 2 decides that the response signal (NACK) from base station 100 to mobile station 1 is DTX. Also, if the response signal is decided to be DTX, mobile station 2 decides that the allocation information received at time t2 is directed to another mobile station, and that the allocation information directed to another mobile station has been mistaken for allocation information directed to that mobile station. Therefore, mobile station 2 does not retransmit uplink data at time t7. That is, mobile station 2 can stop erroneous transmission of uplink data.

Therefore, at time t8, collision of the uplink data from mobile station 1 and the uplink data from mobile station 2 does not occur, and CRC=OK (no error) is decided in base station 100.

Thus, according to the present embodiment, in ARQ in which channels for response signals are shared for use between a plurality of mobile stations, even if a mobile station mistakes allocation information directed to another mobile station for allocation information directed to the subject mobile station, it is possible to prevent damage of ARQ control.

(Embodiment 2)

Figure 10:
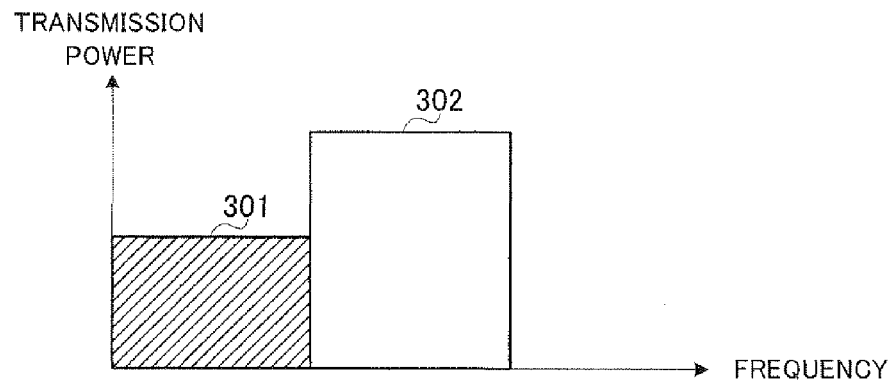
FIG. 10 illustrates an example of transmission power control according to Embodiment 2.

A base station may control the transmission power of allocation information on a per mobile station basis. For example, base station 100 shown in FIG. 2 may be provided with a transmission power control section between modulating section 103 and S/P section 104, and, in this transmission power control section, control the transmission power of allocation information symbols received as input from modulating section 103. Generally, transmission power is controlled based on the distance from the base station, and, consequently, as shown in FIG. 10, allocation information 301 directed to a mobile station located in a point close to the base station (e.g. allocation information 301 directed to the mobile station in the cell center) requires low transmission power, and allocation information 302 directed to a mobile station located in a point far from the base station (e.g. allocation information 302 directed to a mobile station in a cell edge) requires high transmission power.

Also, for the above blind detection of allocation information in deciding section 209 of mobile station 200, an erroneous decision is more likely to be made when the BER (Bit Error Rate) of allocation information is higher.

Figure 11:
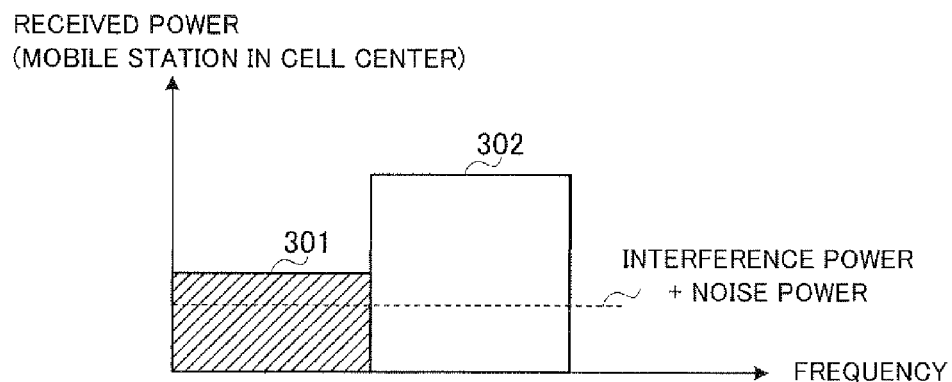
FIG. 11 illustrates an example of received power according to Embodiment 2 (the mobile station in the cell center)

For example, as shown in FIG. 11, in the mobile station in the cell center, the received power of above allocation information 301 and the received power of above allocation information 302 are both sufficiently higher than interference power and noise power. Therefore, in the mobile station in the cell center, both allocation information have a low BER. Therefore, in the mobile station in the cell center, allocation information directed to that mobile station is less likely to be mistaken for allocation information directed to another mobile station, and allocation information directed to another mobile station is less likely to be mistaken for allocation information directed to that mobile station.

Figure 12:
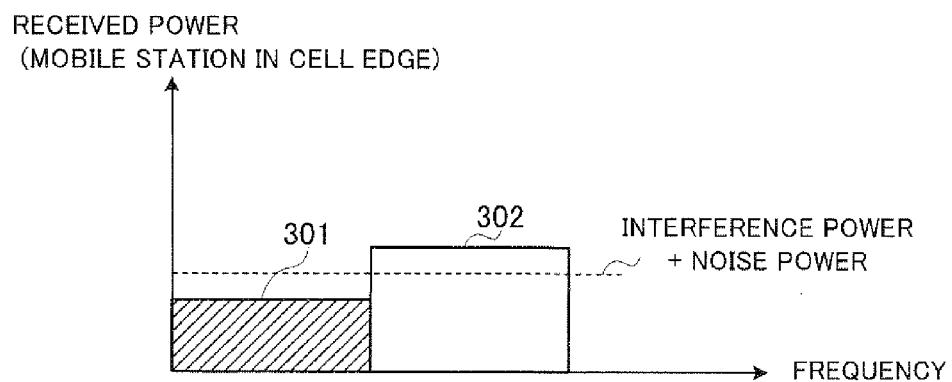
FIG. 12 illustrates an example of received power according to Embodiment 2 (a mobile station in a cell edge)

On the other hand, in a mobile station in a cell edge, as shown in FIG. 12, there is a high possibility that the received power of above allocation information 302 is significantly higher than interference power and noise power, and that the received power of above allocation information 301 is lower than interference power and noise power. That is, in a mobile station in a cell edge, although the BER of above allocation information 302 is low, the BER of above allocation information 301 is high. Therefore, in a mobile station in a cell edge, although allocation information directed to that mobile station is less likely to be mistaken for allocation information directed to another mobile station, allocation information directed to another mobile station is more likely to be mistaken for allocation information directed to that mobile station.

Figure 1:
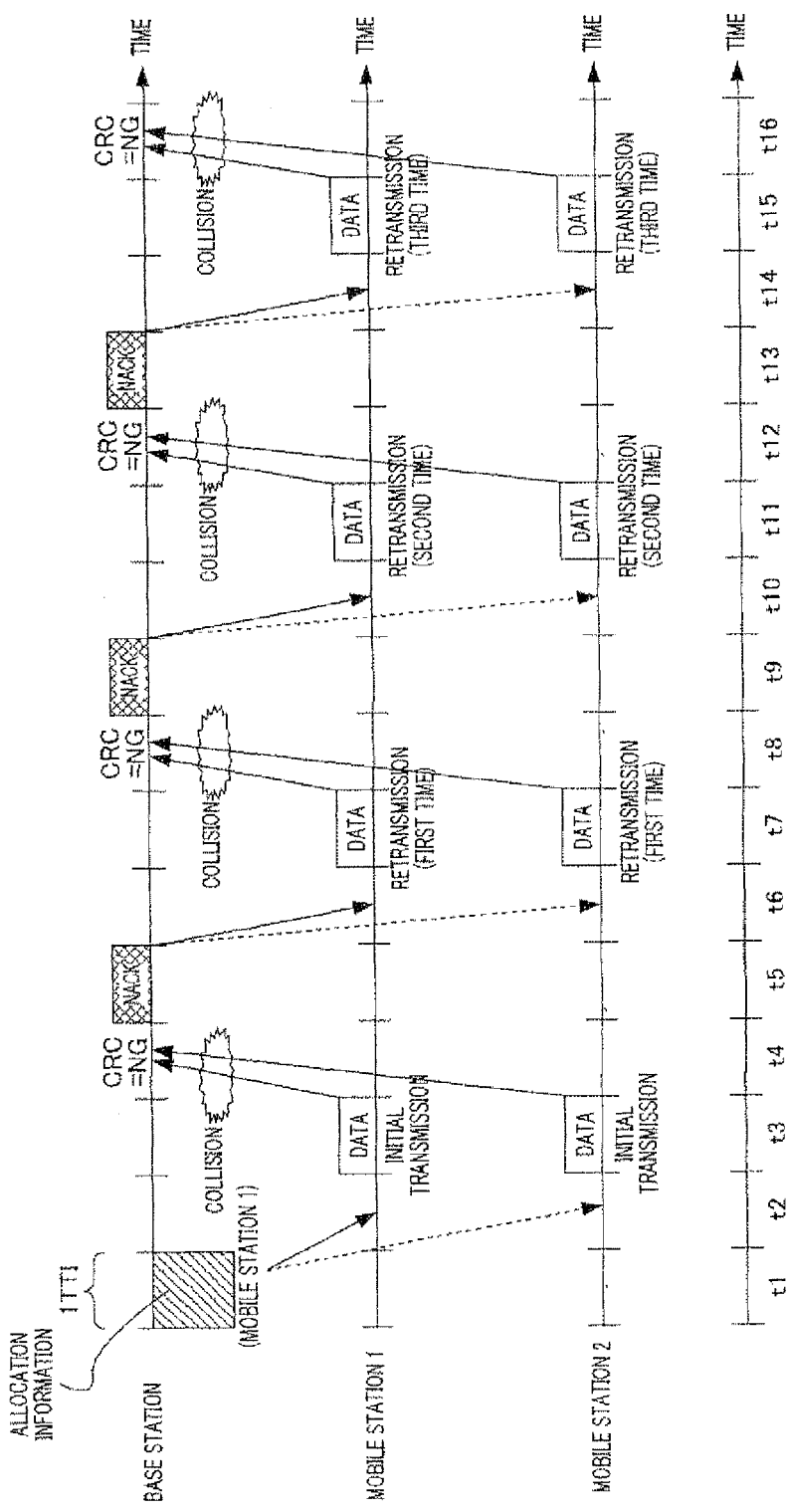
FIG. 1 illustrates an example of a sequence in ARQ.

That is, if mobile station 1 is located in the cell center and mobile station 2 is located in a cell edge in FIG. 1 and FIG. 4, at time t2, mobile station 2 is likely to mistake allocation information directed to mobile station 1 for allocation information directed to mobile station 2 by blind detection. In other words, if mobile station 1 and mobile station 2 are both in the cell center or mobile station 1 and mobile station 2 are both in a cell edge, these mobile stations are less likely to mistake allocation information directed to the other mobile station for allocation information directed to the subject mobile station.

Therefore, as shown in FIG. 13, the present embodiment groups a plurality of mobile stations in a cell into a cell-center group and a cell-edge group, scrambles all response signals directed to the mobile stations belonging to the cell-center group by SC #1, and scrambles all response signals directed to the mobile stations belonging to the cell-edge group by SC #2. That is, a plurality of mobile stations in a cell are grouped into a plurality of groups based on the distance from the base station, and different scrambling codes are allocated between the plurality of groups. Here, the same scrambling code is used in the same group.

FIG. 13 illustrates a case where mobile stations 1, 3, 4 and 6 are located in the cell center and mobile stations 2 and 5 are in a cell edge. Therefore, mobile stations 1, 3, 4 and 6 form the first group and mobile stations 2 and 5 forms the second group. That is, all response signals directed to mobile stations 1, 3, 4 and 6 are scrambled by SC #1, and all response signals directed to mobile stations 2 and 5 are scrambled by SC #2.

Thus, according to the present embodiment, it is possible to allocate scrambling codes on a per mobile station group basis, so that it is not necessary to allocate different scrambling codes to all mobile stations in a cell. Therefore, even if the number of available scrambling codes is small, it is possible to allocate scrambling codes to mobile stations in an efficient manner.

Also, the present embodiment is effective especially when the repetition factor in repetition section 106 is small. This is because, for example, if the repetition factor RF in repetition section 106 is 4, the code length of a scrambling code used in scrambling section 107 is short, 4, and, in this case, the number of available scrambling codes is small, and it is not possible to allocate different scrambling codes to all mobile stations in a cell.

(Embodiment 3)

In Embodiment 2, if a plurality of mobile stations forming a cell-edge group are likely to receive response signals directed to different mobile stations incorrectly as response signals directed to the subject mobile stations, as shown in FIG. 14, it may be preferable to allocate different scrambling codes to the plurality of mobile stations belonging to the cell-edge group. For example, although Embodiment 2 (FIG. 13) allocates SC #2 to both mobile stations 2 and 5, the present embodiment (FIG. 14) allocates SC #2 to mobile station 2 and allocates SC #3 to mobile station 5.

The present embodiment is effective especially when channels for allocation information and channels for response signals are not associated. If channels for allocation information and channels for response signals are associated, mobile station 2 shown in FIG. 4 can receive a response signal transmitted from the base station to mobile station 1. However, if channels for allocation information and channels for response signals are not associated, mobile station 2 shown in FIG. 4 may receive a response signal transmitted from the base station to a mobile station other than mobile station 1 (in this case, mobile station 5). That is, when mobile station 1 is located in the cell center and mobile stations 2 and 5 are located in a cell edge, mobile station 2 is likely to receive a response signal directed to mobile station 5 incorrectly, and, similarly, mobile station 5 is likely to receive a response signal directed to mobile station 2 incorrectly.

Therefore, as shown in FIG. 14, the present embodiment allocates an identical scrambling code to a plurality of mobile stations belonging to the cell-center group as in Embodiment 2, while allocating different scrambling codes to a plurality of mobile stations belonging to the cell-edge group.

(Embodiment 4)

A base station may control the transmission power of response signals on a per mobile station basis. For example, base station 100 shown in FIG. 2 may be provided with a transmission power control section between scrambling section 107 and S/P section 108, and control the transmission power of response signals received as input from scrambling section 107 in this transmission power control section. Generally, transmission power is controlled based on the distance from the base station, and, consequently, a response signal directed to a mobile station located in a point close to the base station (e.g. a response signal directed to the mobile station in the cell center) requires low transmission power, and a response signal directed to a mobile station located in a point far from the base station (e.g. a response signal directed to a mobile station in a cell edge) requires high transmission power.

Also, if the cell radius is large, instead of dividing one cell into two of the cell-center part and the cell-edge part, it is possible to divide one cell into three or more based on the distance from the base station. Further, if the cell radius is large, the distance between the cell center and a cell edge is long, and, consequently, a response signal directed to the mobile station in the cell center does not reach a mobile station in the cell edge. Therefore, in a mobile station in a cell edge, the received power of a response signal directed to the mobile station in the cell center is substantially 0. That is, in a mobile station in a cell edge, the constellation point of a response signal directed to the mobile station in the cell center is (I, Q)=(0, 0). Therefore, demodulating section 213 of a mobile station in a cell edge can decide that a response signal directed to the mobile station in the cell center is DTX, regardless of scrambling codes.

Therefore, as shown in FIG. 15, the present embodiment groups a plurality of mobile stations in a cell into a plurality of groups based on the distance from the base station, and scrambles, by SC #1, all response signals directed to the mobile stations belonging to the cell-center group and all response signals directed to the mobile stations belonging to the cell-edge group. Further, the present embodiment scrambles response signals directed to mobile stations belonging to other groups by different scrambling codes between groups. That is, the present embodiment differs from Embodiment 2 in allocating the identical scrambling code to the cell-center group and the cell-edge group. Also, in FIG. 15, when the numeral of distance is larger, the distance from the base station is longer, and distance 1 corresponds to the cell center and distance 5 corresponds to a cell edge.

Thus, the present embodiment can allocate the same scrambling code to the cell-center group and the cell-edge group at a great distance from each other, so that it is possible to allocate scrambling codes to mobile stations efficiently.

(Embodiment 5)

The MCS (Modulation and Coding Scheme) for allocation information may vary between mobile stations. For example, encoding section 102 and modulating section 103 of base station 100 shown in FIG. 2 may change the coding rate and modulation scheme on a per mobile station basis. Generally, an MCS is controlled based on the received quality of each mobile station, and, consequently, allocation information directed to a mobile station of high received quality (e.g. a mobile station in the cell center) has a high MCS level, and allocation information 301 directed to a mobile station of low received quality (e.g. a mobile station in a cell edge) has a low MCS level. Also, an MCS of a higher MCS level has a higher transmission rate.

Also, in the above blind detection of allocation information in deciding section 209 of mobile station 200, allocation information of a higher BER is more likely to be misidentified.

For example, in a mobile station that demodulates and decodes allocation information by QPSK and R=½, if allocation information with an MCS of QPSK and R=½ for coding and modulation is received, the transmitting and receiving MCS's match, so that it is possible to perform demodulation and decoding correctly, which lowers the BER of allocation information. On the other hand, in a mobile station that demodulates and decodes allocation information by QPSK and R=½, if allocation information with an MCS of QPSK and R=¼ for coding and modulation is received, the transmitting and receiving MCS's do not match, and, consequently, it is not possible to perform demodulation and decoding correctly, which increases the BER of allocation information (BER≈0.5). Similarly, in a mobile station that demodulates and decodes allocation information by QPSK and R=¼, allocation information with an MCS of QPSK and R=¼ for coding and modulation has a low BER, and allocation information with an MCS of QPSK and R=½ for coding and modulation has a high BER. That is, when the MCS used for coding and modulation on the transmitting side and the MCS used for demodulation and decoding on the receiving side match, the BER is low, and, when the MCS used for coding and modulation on the transmitting side and the MCS used for demodulation and decoding on the receiving side do not match, the BER is high.

Therefore, as shown in FIG. 16, the present embodiment groups a plurality of mobile stations in a cell into a plurality of groups based on an MCS, and allocates different scrambling codes between the plurality of groups. Here, an identical scrambling code is used in an identical group.

For example, FIG. 16 illustrates a case where allocation information with an MCS of QPSK and R=½ is allocated to mobile stations 1, 3, 4 and 6, and allocation information with an MCS of QPSK and R=¼ is allocated to mobile stations 2 and 5. Therefore, mobile stations 1, 3, 4 and 6 form the first group, and mobile stations 2 and 5 form the second group. All response signals directed to mobile stations 1, 3, 4 and 6 are then scrambled by SC #1, and all response signals directed to mobile stations 2 and 5 are scrambled by SC #2.

Thus, according to the present embodiment, as in Embodiment 2, it is possible to allocate scrambling codes on a per mobile station group basis, so that it is not necessary to allocate different scrambling codes to all mobile stations in a cell. Therefore, even if the number of available scrambling codes is small, it is possible to allocate scrambling codes to mobile stations in an efficient manner.

Also, as in Embodiment 2, the present embodiment is effective especially when the repetition factor in repetition section 106 is small. This is because, for example, if the repetition factor RF in repetition section 106 is 4, the code length of a scrambling code used in scrambling section 107 is short, 4, and, in this case, the number of available scrambling codes is small, and it is not possible to allocate different scrambling codes to all mobile stations in a cell.

Also, it is possible to change an MCS for allocation information adaptively, based on downlink quality. In this case, a mobile station may demodulate allocation information using a plurality of MCS's and descramble a response signal by a scrambling code corresponding to an MCS of CRC=OK (no error).

Also, when a plurality of bits forming allocation information are interleaved to prevent burst error of allocation information, the interleaving pattern may vary between mobile stations. In this case, as described above, when the interleaving pattern used for interleaving on the transmitting side and the interleaving pattern used for deinterleaving on the receiving side match, the BER is low, and, when the interleaving pattern used for interleaving on the transmitting side and the interleaving pattern used for deinterleaving on the receiving side do not match, the BER is high. Therefore, as described above, it is equally possible to group a plurality of mobile stations in a cell into a plurality of groups based on interleaving patterns, allocate different scrambling codes between the plurality of groups, and use an identical scrambling code in an identical group.

Embodiments of the present invention have been explained above.

Also, in above Embodiments 2, 3 and 4, it is possible to estimate the distance between a base station and a mobile station as follows. Estimating methods 1 to 5 will be explained below.

(1) In the case of using received quality information such as CQI (Channel Quality Indicator) and received SINR In this case, the distance between a base station and a mobile station is estimated to be shorter when received quality is higher, or the distance between a base station and a mobile station is estimated to be longer when received quality is lower.

(2) In the case of using delay spread information of received signals

In this case, the distance between a base station and a mobile station is estimated to be shorter when delay spread is smaller, or the distance between a base station and a mobile station is estimated to be longer when delay spread is larger.

(3) In the case of using timing difference information between the receiving timing of a downlink signal and the transmitting timing of an uplink signal In this case, the distance between a base station and a mobile station is estimated to be shorter when the above timing difference is larger, or the distance between a base station and a mobile station is estimated to be longer when the above timing difference is smaller.

(4) In the case of using transmission power control information

In this case, the distance between a base station and a mobile station is estimated to be shorter when transmission power is lower, or the distance between a base station and a mobile station is estimated to be longer when transmission power is larger.

(5) In the case of using MCS (Modulation and Coding Scheme) information

In this case, the distance between a base station and a mobile station is estimated to be shorter when an MCS level is higher (i.e. when an MCS provides a higher transmission rate), or the distance between a base station and a mobile station is estimated to be longer when the MCS level is lower (i.e. when the MCS provides a lower transmission rate).

Also, in the above embodiments, a base station may use control information to report, to the mobile stations, scrambling codes to be used in mobile stations.

Also, even in the case of using a stop signal that commands to stop uplink data transmission instead of an ACK and a re-transmit signal that commands to restart uplink data transmission instead of a NACK, as a response signal, the present invention can be implemented in the same way as in the above embodiments.

Also, even in the case of using only one of an ACK and a NACK as a response signal, the present invention can be implemented in the same way as in the above embodiments. In the case of using only an ACK as a response signal, a mobile station decides that a response signal is an ACK or DTX in the same way as above. By contrast, in the case of using only a NACK as a response signal, a mobile station decides that a response signal is a NACK or DTX in the same way as above.

Also, the present invention is not limited by the magnitude of a repetition factor.

Also, in the case of transmitting an identical response signal to a plurality of mobile stations belonging to the same group, the present invention can be implemented in the same way as in the above embodiments.

Figure 17:
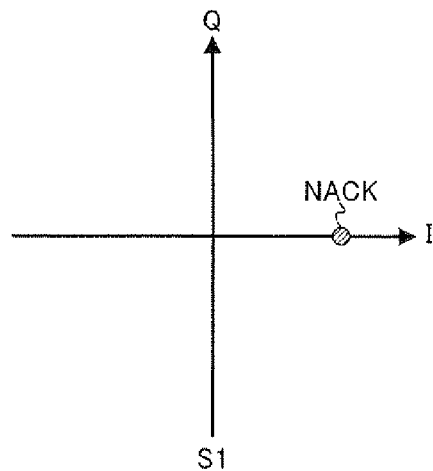
FIG. 17 illustrates another example of a response signal.
Figure 18:
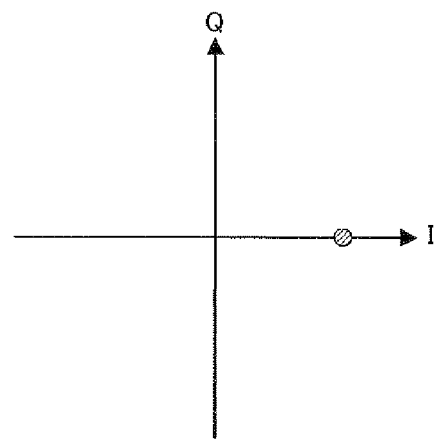
FIG. 18 illustrates an example of phase rotation (mobile station 1)
Figure 19:
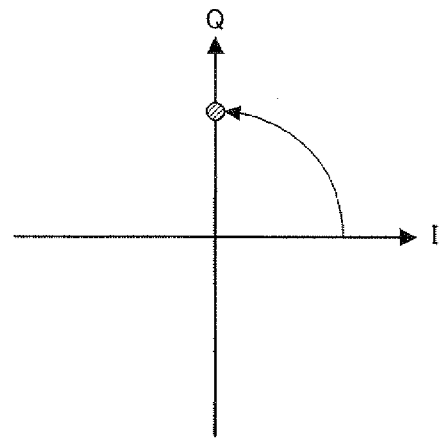
FIG. 19 illustrates an example of phase rotation (mobile station 2)
Figure 20:
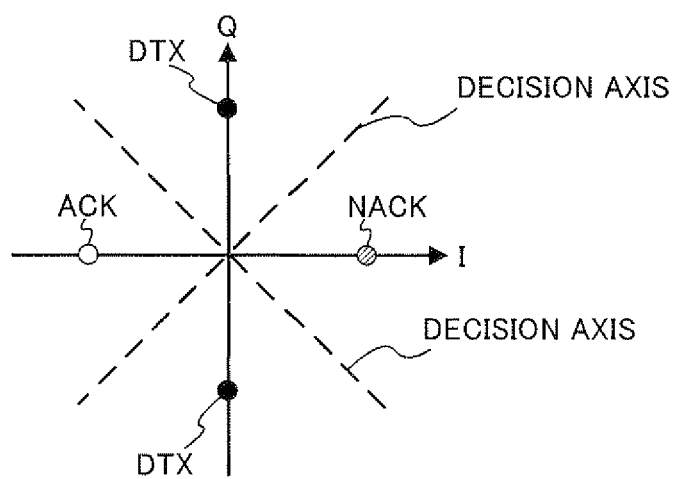
FIG. 20 illustrates another decision example.

Also, even in the case of using phase rotation processing that gives a mobile-station-specific phase rotation to a response signal, it is possible to provide the same operational effect as in the case of using the above scrambling processing. For example, if a response signal fed back from a base station is S1 shown in FIG. 17, mobile station 1 does not give a phase rotation to S1 as shown in FIG. 18, and mobile station 2 gives a phase rotation of $\pi/2$ to S1 as shown in FIG. 19. Further, based on the decision axis shown in FIG. 20, mobile station 1 identifies S1 of a phase rotation amount of 0, and mobile station 2 identifies S1 of a phase rotation amount of $\pi/2$. Therefore, as in Embodiment 1, mobile station 1 can decide that a NACK directed to that mobile station from the base station is a NACK, and mobile station 2 can decide that a NACK directed to mobile station 1 from the base station is DTX.

A mobile station, a base station and a subcarrier may be referred to as a "UE," a "Node B" and a "tone," respectively. Also, a CP may be referred to as a "guard interval (GI)."

Also, the transform method between the frequency domain and the time domain is not limited to IFFT and FFT.

Although an example case has been described above with the embodiments where the downlink transmission scheme is the OFDM scheme, the downlink transmission scheme is not particularly limited in the present invention.

Also, to improve received quality, a response signal may be spread, duplicated and so on. Even in this case, it is equally possible to implement the present invention in the same way as above.

Although a case has been described above with embodiment as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-165681, filed on Jun. 22, 2007, including the specification, drawings and abstract, is incorporated herein by reference in its entirety.

Industrial Applicability

The present invention is applicable to, for example, a mobile communication system.

The invention claimed is:

1. A radio communication base station apparatus comprising:
    a repetition processor that repeats a response signal to produce a plurality of response signals;
    a scrambling processor that scrambles the plurality of response signals by a scrambling code that is specific to a mobile station; and
    a transmitting section that transmits data to the mobile station on a downlink data channel, and transmits the scrambled plurality of response signals to the mobile station on a downlink common channel, which is different from the downlink data channel and is used commonly among transmissions of response signals to a plurality of mobile stations.

2. The radio communication base station apparatus according to claim 1, wherein the scrambling processor scrambles the plurality of response signals by a scrambling code allocated to a mobile station group, to which the mobile station belongs, among a plurality of mobile station groups classified based on a distance from the radio communication base station apparatus.

3. The radio communication base station apparatus according to claim 1, wherein the scrambling processor scrambles the plurality of response signals by a scrambling code allocated to a mobile station group, to which the mobile station belongs, among a plurality of mobile station groups classified based on a modulation and coding scheme for allocation information indicating an allocation result of an uplink data channel.

4. A scrambling method for a response signal in an automatic repeat request, comprising:
    scrambling a plurality of response signals by a scrambling code that is specific to a mobile station;
    transmitting data to the mobile station on a downlink data channel; and
    transmitting the scrambled plurality of response signals to the mobile station on a downlink common channel, which is different from the downlink data channel and is used commonly among transmissions of response signals to a plurality of mobile stations.

* * * * *